US007954000B2

(12) United States Patent
Allen et al.

(10) Patent No.: US 7,954,000 B2
(45) Date of Patent: May 31, 2011

(54) POWER SUPPLY CURRENT SPIKE REDUCTION TECHNIQUES FOR AN INTEGRATED CIRCUIT

(75) Inventors: David H. Allen, Rochester, MN (US); Roger J. Gravrok, Eau Claire, WI (US); Kenneth A. Van Goor, Fall Creek, WI (US)

(73) Assignee: International Business Machines Corporation, Armonk, NY (US)

( * ) Notice: Subject to any disclaimer, the term of this patent is extended or adjusted under 35 U.S.C. 154(b) by 708 days.

(21) Appl. No.: 12/013,928

(22) Filed: Jan. 14, 2008

(65) Prior Publication Data
US 2009/0183019 A1 Jul. 16, 2009

(51) Int. Cl.
*G06F 1/08* (2006.01)
(52) U.S. Cl. .......................... 713/502; 327/295; 713/330
(58) Field of Classification Search .................. 713/330, 713/502; 327/295
See application file for complete search history.

(56) References Cited

U.S. PATENT DOCUMENTS

| 7,046,069 | B2 | 5/2006 | Krasnansky et al. |
| 7,386,749 | B2 * | 6/2008 | Rifani et al. ................... 713/400 |
| 7,669,151 | B1 * | 2/2010 | Boyle et al. ....................... 716/2 |
| 7,685,458 | B2 * | 3/2010 | Yamaoka ....................... 713/501 |

* cited by examiner

*Primary Examiner* — Albert Wang
(74) *Attorney, Agent, or Firm* — Dillon & Yudell LLP

(57) ABSTRACT

An integrated circuit includes a first clock island, a second clock island, a clock generator, and a first programmable delay element. The first clock island is configured to receive a first clock signal. The second clock island is configured to receive a second clock signal. The clock generator is configured to provide a generated clock signal and the first and second clock signals are based on the generated clock signal. The first programmable delay element is coupled between the clock generator and the first clock island. The first programmable delay element is configured to receive the generated clock signal and provide the first clock signal. The integrated circuit is configured to account for a clock skew between the first and second clock signals when information is transferred between the first and second clock islands. In this manner, a predetermined amount of the clock skew may be introduced between the first and second clock signals to smear out, over time, instantaneous power supply current demands of respective logic within the first and second clock islands.

14 Claims, 8 Drawing Sheets

POWER SUPPLY CURRENT SPIKE REDUCTION TECHNIQUES FOR AN INTEGRATED CIRCUIT

BACKGROUND

1. Field

This disclosure relates generally to an integrated circuit and, more specifically, to power supply current spike reduction techniques for an integrated circuit.

2. Related Art

Today, the trend in clock design for relatively large integrated circuits (chips) has been to implement relatively low clock skew for all clock islands (i.e., logic blocks in different clock domains) of a chip. As clock skew reduces available cycle time, lower clock skew has generally provided better chip performance. Clock skew targets of ten picoseconds or less are common in clock designs with cycle times of two-hundred fifty picoseconds or less. However, achieving clocks skews of ten picoseconds or less across an entire chip can be relatively challenging. Moreover, power integrity, power consumption, decoupling capacitor real estate, packaging cost, back-end-of-line (BEOL) grid (i.e., interconnects and vias) cost, and schedule goals may be difficult to attain in chips that are designed to maintain clock skews of ten picoseconds or less across an entire chip. For example, maintaining relatively low clock skew across an entire chip may cause relatively large chips to generate relatively large current spikes (e.g., 920 amperes/nanosecond), which may lead to relatively large power supply voltage droops (e.g., power supply voltage droops of ten to twenty percent). In a known input/output (I/O) design approach, clock skew has been intentionally introduced between I/O buffers associated with an I/O bus in an attempt to reduce interference between adjacent signal paths.

Power supply voltage droop generally causes loss of performance (due to increased circuit delay) if a power supply voltage is not raised to compensate for the voltage droop or relatively high power dissipation results if the power supply voltage is raised to compensate for the voltage droop. Moreover, power supply overshoot (attributable to package inductance) can cause reliability and/or functional issues with noise-susceptible circuitry, such as memory arrays and analog circuits. Known solutions used to mitigate power issues associated with relatively large current spikes include dedicating on-chip real estate (typically about ten percent) to thin-oxide decoupling capacitor cells and/or employing deep-trench capacitors within a chip.

However, on-chip decoupling capacitors are relatively expensive and may lead to decreased integrated circuit yield, due to failure of the on-chip decoupling capacitors. Moreover, even near-ideal on-die power supply decoupling may not satisfy all current spikes, which can exceed one-hundred forty amperes. Additionally, addressing current spikes attributable to reduced clock skew generally also increases first-level and second-level packaging costs. For example, exotic packages (e.g., glass on ceramic) and discrete surface mount technology (SMT) capacitors may be employed to mitigate current spikes. Unfortunately, exotic packages are relatively expensive and discrete SMT capacitors tend to be cumbersome to install. For example, locating package decoupling capacitors close to a chip (e.g., underneath a die) has led to more expensive designs in which one or more holes have been provided in an associated printed circuit board (or card). While high-frequency low-inductance chip array (LICA) capacitors may be implemented off-chip to address current spikes, implementing LICA capacitors off-chip is relatively expensive and may be cost prohibitive for many designs.

SUMMARY

According to one aspect of the present disclosure, an integrated circuit includes a first clock island, a second clock island, a clock generator, and a first programmable delay element. The first clock island is configured to receive a first clock signal. The second clock island is configured to receive a second clock signal. The clock generator is configured to provide a generated clock signal and the first and second clock signals are based on the generated clock signal. The first programmable delay element is coupled between the clock generator and the first clock island. The first programmable delay element is configured to receive the generated clock signal and provide the first clock signal. The integrated circuit is also configured to account for a clock skew between the first and second clock signals when information is transferred between the first and second clock islands. According to various aspects of the present disclosure, a predetermined amount of the clock skew is introduced to smear out (over time) instantaneous power supply current demands of respective logic within the first and second clock islands. In this manner, composite (global) chip-level current demands may be smoothed out to effectively reduce power supply noise.

According to another aspect of the present disclosure, a technique for increasing integrated circuit yield includes providing a first clock signal to a first clock island included in an integrated circuit. A second clock signal is provided to a second clock island included in the integrated circuit. The first and second clock signals are based on a generated clock signal. A first clock skew of the first clock signal is adjusted. A first value for the first clock skew is determined when signals passing between the first and second clock islands both pass timing requirements. The first value is then programmed into a first programmable delay element that is coupled between a clock generator (that provides the generated clock signal) and the first clock island.

According to one embodiment of the present disclosure, an integrated circuit includes a first clock island, a second clock island, a clock generator, and a first programmable delay element. The first clock island is configured to receive a first clock signal. The second clock island is configured to receive a second clock signal. The first clock island includes a first logic block (e.g., a first processor core) and the second clock island includes a second logic block (e.g., a second processor core). The clock generator is configured to provide a generated clock signal and the first and second clock signals are based on the generated clock signal. The first programmable delay element is coupled between the clock generator and the first clock island. The first programmable delay element is configured to receive the generated clock signal and provide the first clock signal. The integrated circuit is also configured to account for a clock skew between the first and second clock signals when information is transferred between the first and second clock islands.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

DETAILED DESCRIPTION

Figure 1:
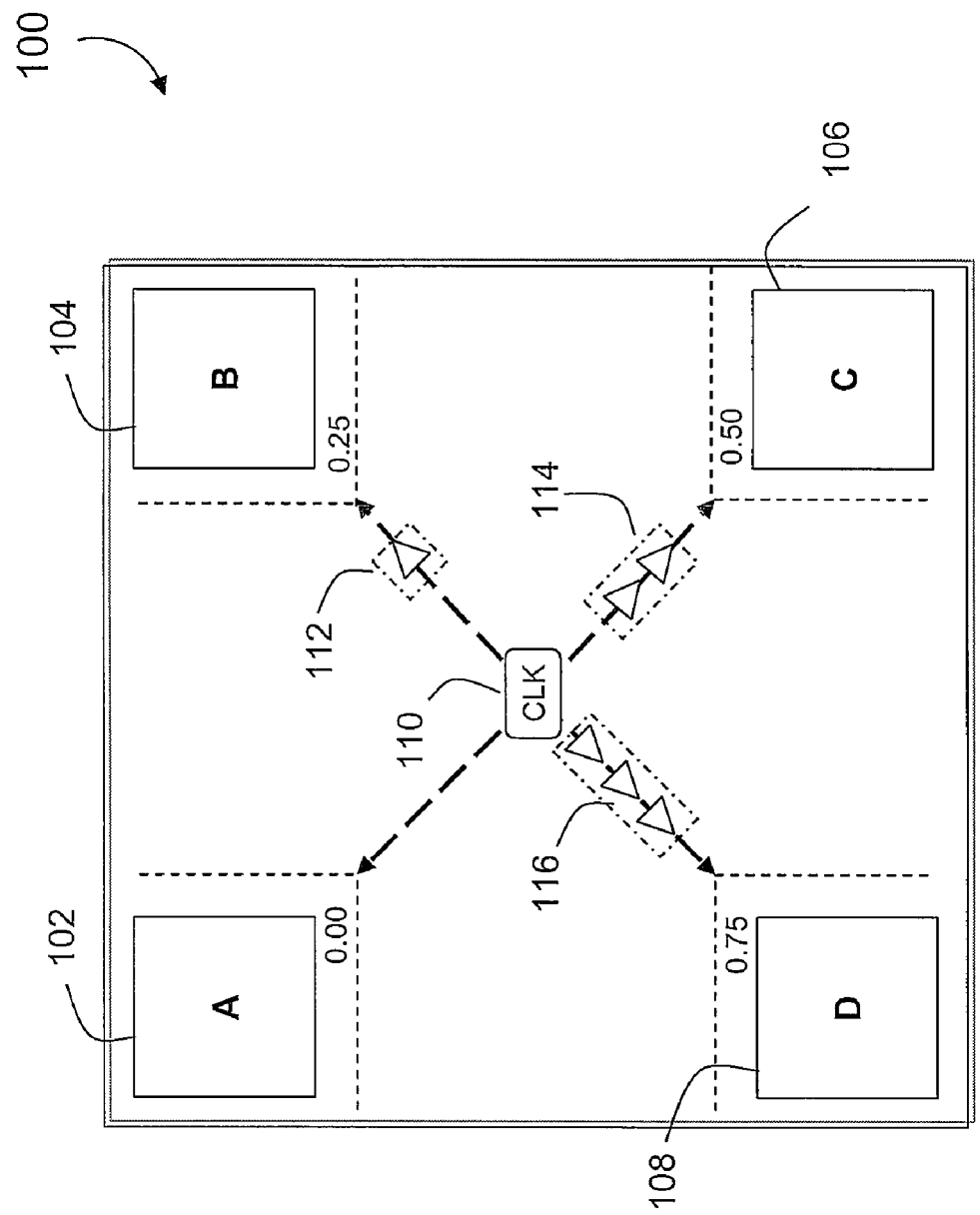
FIG. 1 is a diagram of an integrated circuit (chip) that includes multiple clock islands that are clocked by a common clock signal that is skewed (by, for example, a different amount for each of the clock islands) to reduce current spikes, according to the present disclosure.

As will be appreciated by one of ordinary skill in the art, the present invention may be embodied as a method, system, device, or computer program product. Accordingly, aspects of the present invention may take the form of an entirely hardware embodiment, an entirely software embodiment, or an embodiment combining software and hardware aspects that may all generally be referred to herein as a "circuit," "module," or "system." For example, an entirely software embodiment of the present invention may take the form of one or more design files encoded on a computer-usable storage medium.

Any suitable computer-usable or computer-readable storage medium may be utilized. The computer-usable or computer-readable storage medium may be, for example, but is not limited to an electronic, magnetic, optical, electromagnetic, infrared, or semiconductor system, apparatus, or device. More specific examples (a non-exhaustive list) of the computer-readable medium includes the following: a portable computer diskette, a hard disk, a random access memory (RAM), a read-only memory (ROM), an erasable programmable read-only memory (EPROM) or Flash memory, a portable compact disc read-only memory (CD-ROM), an optical storage device, or a magnetic storage device. Note that the computer-usable or computer-readable storage medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this disclosure, a computer-usable or computer-readable storage medium may be any medium that can contain or store a program for use by or in connection with an instruction execution system, apparatus, or device. As used herein, the term "coupled" includes both a direct electrical connection between blocks or components and an indirect electrical connection between blocks or components achieved using intervening blocks or components.

As noted above, conventionally, relatively low clock skew designs have been implemented to improve global timing for an integrated circuit (chip). Moreover, in a typical application, local clock skew within a given clock island is maintained at a relatively low level to simplify local timing. However, relatively low clock skew designs may lead to larger power supply current spikes over shorter time periods, which can increase instantaneous power consumption and increase packaging costs for a chip. The present disclosure is generally directed to techniques (that also tend to reduce a cost of the chip) for reducing global power supply current spikes and instantaneous power consumption of a chip. Normally, reducing global power supply spikes reduces overall chip power consumption. According to the present disclosure, power supply spikes are generally reduced by isolating clock islands and performing global skew engineering. It should be appreciated that when clock signals provided to different clock islands of a chip are skewed with respect to each other the introduced skew must also be considered when transferring information between the clock islands. As used herein, the term "clock island" is used to denote a logic block that, within a specific clock domain, is triggered off the same clock signal. According to various aspects of the present disclosure, instantaneous global power demand of a chip is reduced by introducing a controlled amount of clock skew between clock islands across a chip. In various embodiments, the clock islands follow natural logic partitions dictated by a design architecture. For example, each of the clock islands may correspond to a different central processing unit (CPU) core of an integrated circuit that includes multiple CPU cores.

According to the present disclosure, an engineered amount of clock skew is introduced between clock islands, while communication between the clock islands is engineered to provide a finite clock skew between the clock islands. In this manner, global power demand is averaged out (in space and time) to reduce overall power consumption and simplify power delivery. Various disclosed techniques reverse the current design trend (of reducing clock skew to a minimum amount) by intentionally introducing an engineered amount of clock skew between clock islands of a chip to effectively smooth out overall (global) current demand of the chip. Engineering the propagation delay of clock signal fan-out paths (provided to respective clock islands of a chip) to have different clock skews generally reduces (local and global) voltage droop at the chip, while improving performance and reliability of the chip. Hardware features (e.g., fixed buffers or programmable delay lines) provided on a chip may be employed to facilitate adjustment of clock edges on clock signals provided by a single clock generator to various clock islands (clock domains). Clock edges can be adjusted statically (e.g., set once in hardware) or dynamically (adjusted in real-time (based on current conditions) or periodically). In various embodiments, signals spanning clock domains are architected and timed to ensure no late mode or early mode violations are generated when clock edges are moved.

Figure 2:
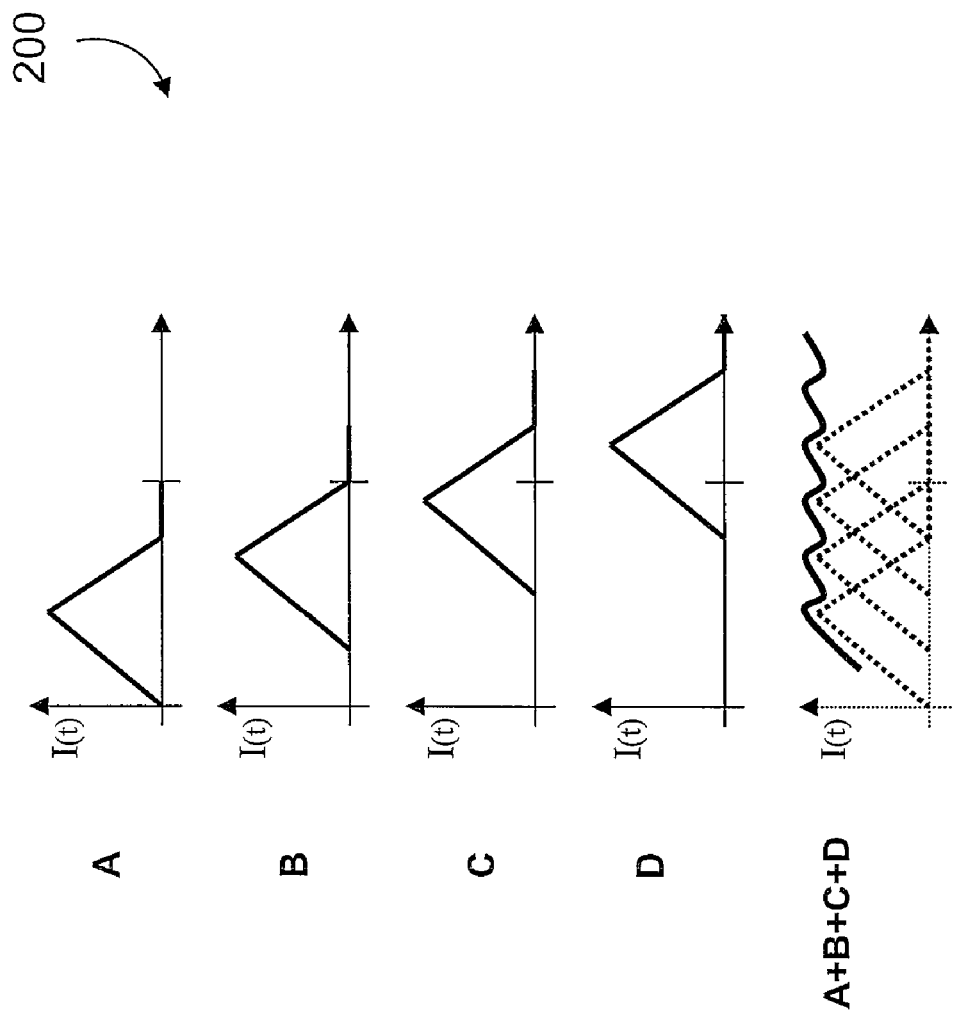
FIG. 2 depicts example current-demand waveforms that illustrate a smoothing affect in instantaneous current draw achieved by the chip of FIG. 1.

With reference to FIG. 1, an example chip 100 includes four clock islands 102, 104, 106, and 108 that each receive respective clock signals from a single clock generator 110. As is illustrated: the island 102 receives a first clock signal from the clock generator 110 that is not skewed; the island 104 receives a second clock signal from the clock generator 110 that is skewed by, for example, an amount approximately equal to one-quarter of a clock cycle; the island 106 receives a third clock signal from the clock generator 110 that is skewed by, for example, one-half of the clock cycle; and the island 108 receives a fourth clock signal from the clock generator 110 that is skewed by, for example, three-quarters of the clock cycle. The clock skews for the islands 104, 106, and 108 are provided by delay elements 112, 114, and 116, respectively. The delay elements 112-116 may be, for example, programmable delay elements or fixed delay elements (such as buffers). Turning to FIG. 2, a diagram 200 illustrates respective instantaneous (local) power supply current demand waveforms (labeled 'A', 'B', 'C', and 'D', respectively) for each of the islands 102-108, as well as an overall (global) instantaneous current (labeled 'A+B+C+D') for the chip 100. It should be noted that by intentionally engineering the clock skew to each of the clock islands 102-108 an overall global power supply demand is smoothed out over time. It should be appreciated that the techniques disclosed herein are broadly applicable to chips that have two or more skew-engineered clock islands.

Figure 3:
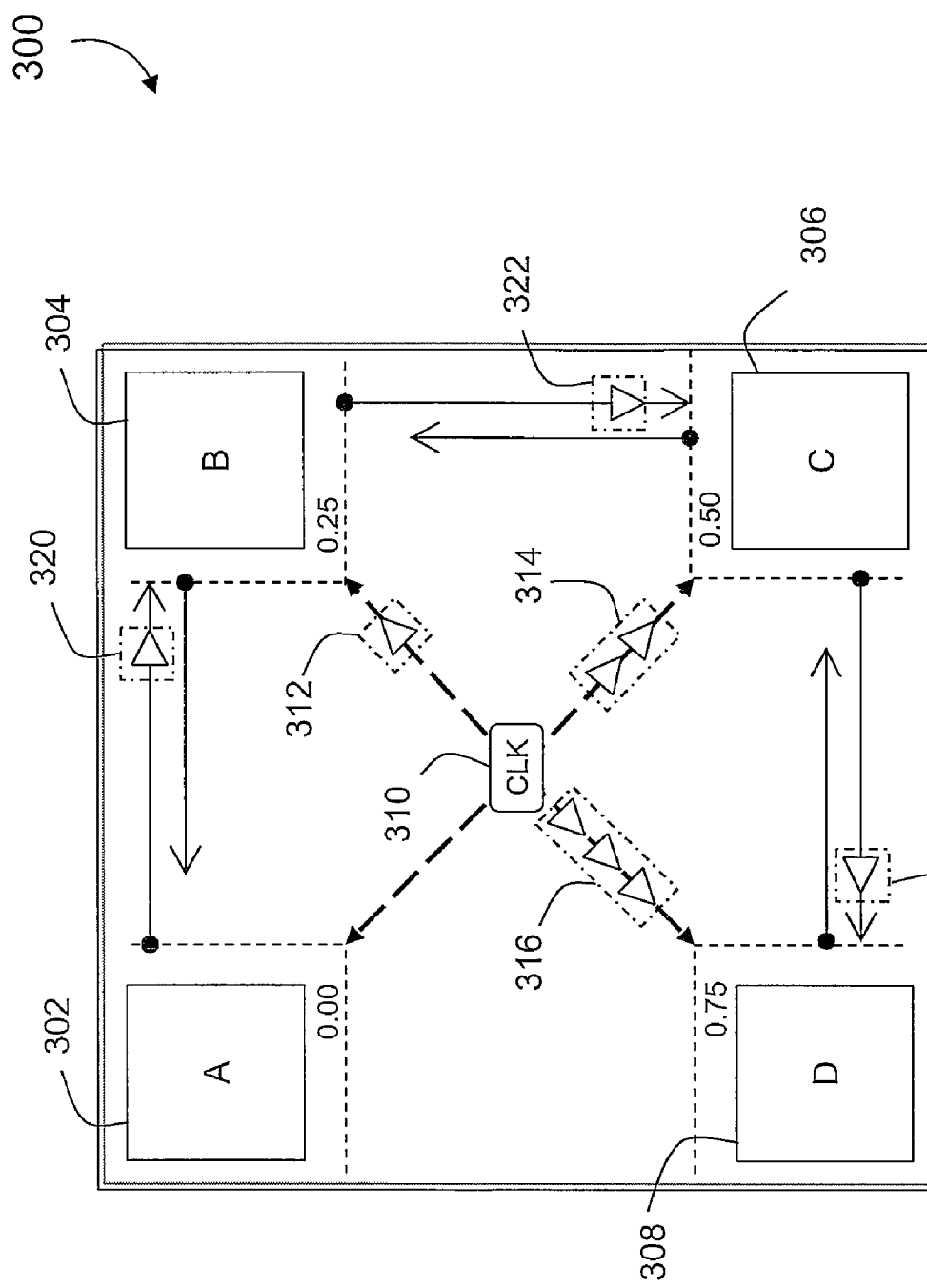
FIG. 3 is a diagram of a chip that includes multiple clock islands that are clocked by a common clock signal that is skewed (by a different amount for each of the clock islands) to reduce current spikes and includes delay elements that are employed to facilitate properly timed information transfer between the clock islands, according to one embodiment of the present disclosure.

Moving to FIG. 3, a chip 300 includes four clock islands 302, 304, 306, and 308 that each receive respective clock signals from a single clock generator 310. As is illustrated: the island 302 receives a first clock signal from the clock generator 310 that is not skewed; the island 304 receives a second clock signal from the clock generator 310 that is skewed by one-quarter of a clock cycle; the island 306 receives a third clock signal from the clock generator 310 that is skewed by one-half of the clock cycle; and the island 308 receives a fourth clock signal from the clock generator 310 that is skewed by three-quarters of the clock cycle. The clock skew for the islands 304, 306, and 308 are provided by delay elements 312, 314, and 316, respectively. As is also illustrated, delay elements 320, 322, and 324, are provided for transferring data between the islands 302 and 304, the islands 304 and 306, and the islands 306 and 308, respectively. As is illustrated, each of the delay elements 320-324 introduce a (similar) one-quarter clock cycle delay. In various embodiments, the delay elements 312-324 are either programmable delay elements or fixed delay elements.

Figure 4:
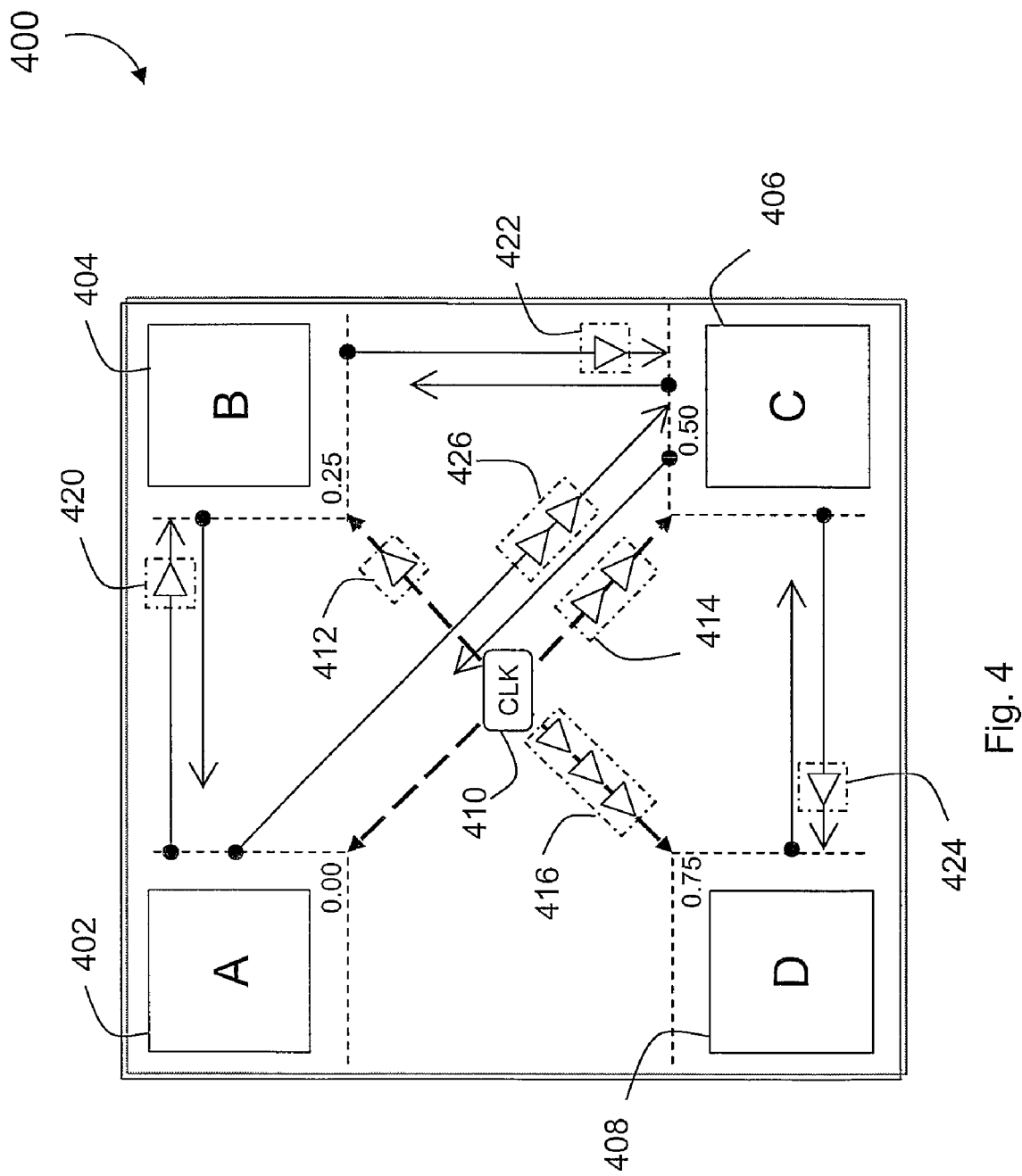
FIG. 4 is a diagram of a chip that includes multiple clock islands that are clocked by a common clock signal that is skewed (by a different amount for each of the clock islands) to reduce current spikes and includes delay elements that are employed to facilitate properly timed information transfer between the clock islands, according to another embodiment of the present disclosure.

With reference to FIG. 4, a chip 400 includes four clock islands 402, 404, 406, and 408 that each receive respective clock signals from a single clock generator 410. As is illustrated: the island 402 receives a first clock signal that is not skewed; the island 404 receives a second clock signal that is skewed by one-quarter of a clock cycle; the island 406 receives a third clock signal that is skewed by one-half of the clock cycle; and the island 408 receives a fourth clock signal that is skewed by three-quarters of the clock cycle. The clock skew for the islands 404, 406, and 408 are provided by delay elements 412, 414, and 416, respectively. As is also illustrated, delay elements 420, 422, 424, and 426, are provided for transferring data between the islands 402 and 404, the islands 404 and 406, the islands 406 and 408, and the islands 402 and 406, respectively. The delay elements 412-426 may be fixed or programmable delay elements depending upon the embodiment.

Figure 5:
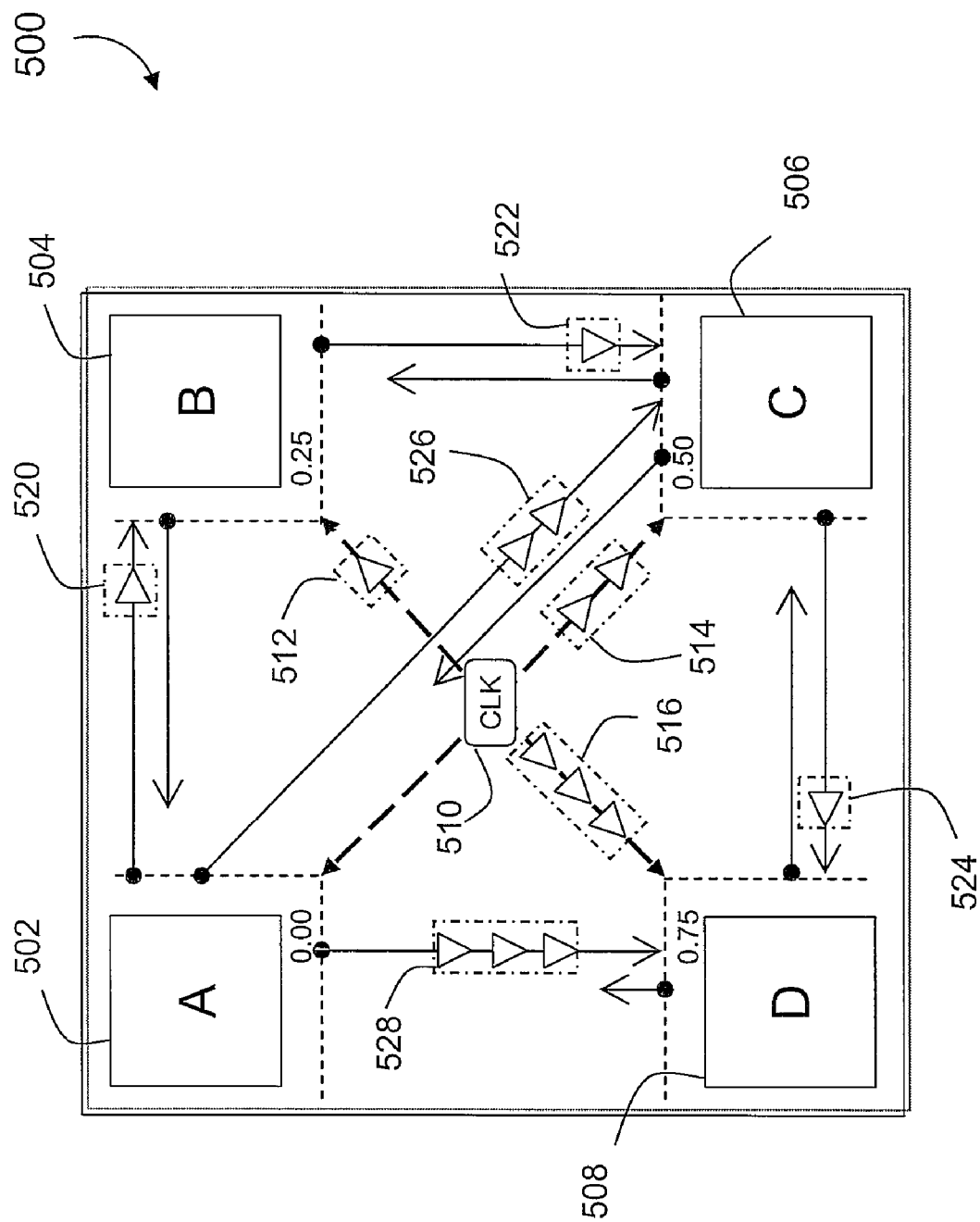
FIG. 5 is a diagram of a chip that includes multiple clock islands that are clocked by a common clock signal that is skewed (by a different amount for each of the clock islands) to reduce current spikes and includes delay elements that are employed to facilitate properly timed information transfer between the clock islands, according to yet another embodiment of the present disclosure.

With reference to FIG. 5, a chip 500 includes four clock islands 502, 504, 506, and 508 that each receive respective clock signals. As is illustrated: the island 502 receives a first clock signal from clock generator 510 that is not skewed; the island 504 receives a second clock signal from the clock generator 510 that is skewed by one-quarter of a clock cycle; the island 506 receives a third clock signal from the clock generator 510 that is skewed by one-half of the clock cycle; and the island 508 receives a fourth clock signal from the clock generator 510 that is skewed by three-quarters of the clock cycle. The clock skew for the islands 504, 506, and 508 are provided by delay elements 512, 514, and 516, respectively. As is also illustrated, delay elements 520, 522, 524, 526, and 528, are provided for transferring data between the islands 502 and 504, the islands 504 and 506, the islands 506 and 508, the islands 502 and 506, and the islands 502 and 508 respectively. The delay elements 512-528 may be programmable or fixed delay elements, depending on the embodiment.

Figure 6:
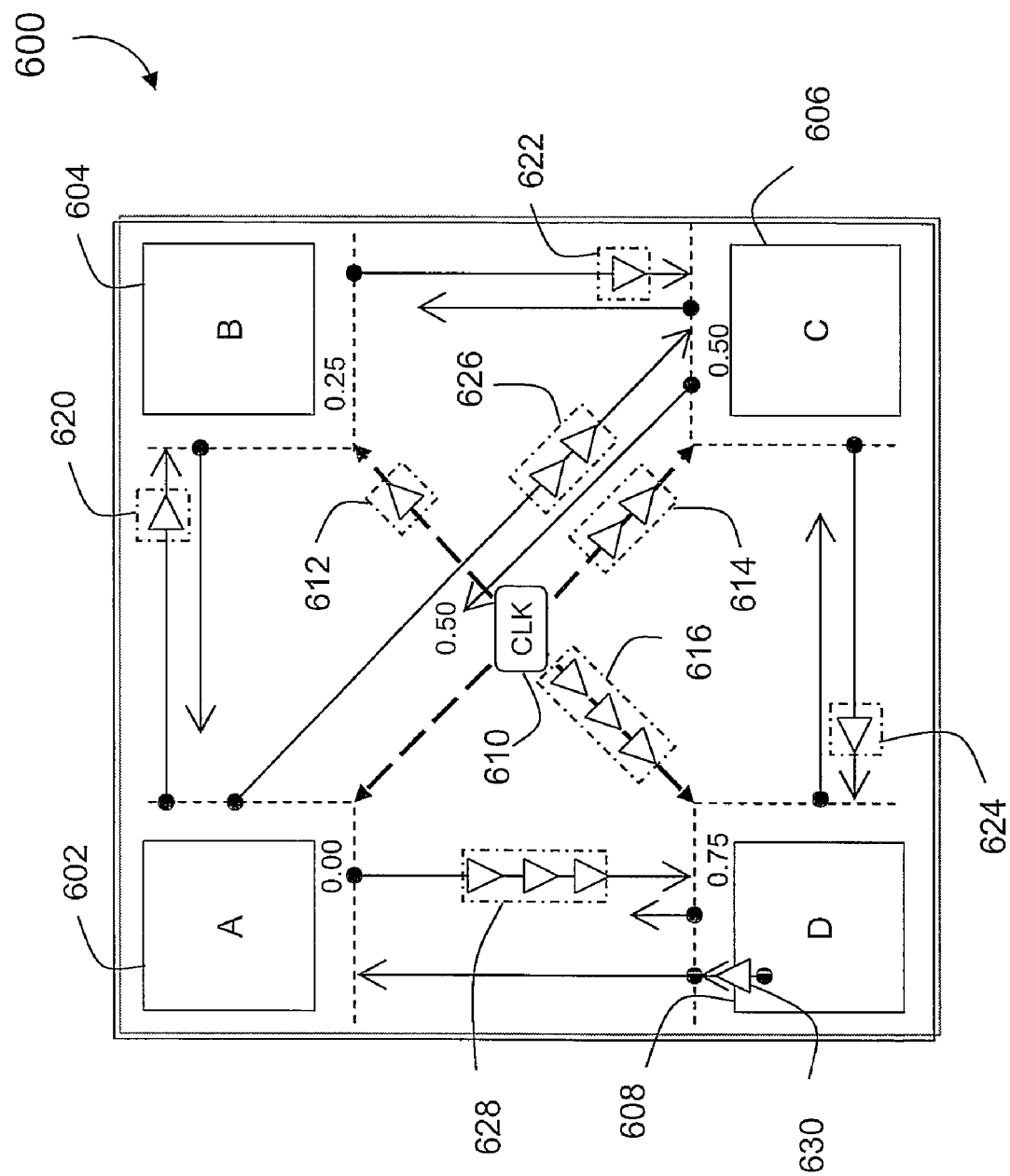
FIG. 6 is a diagram of a chip that includes multiple clock islands that are clocked by a common clock signal that is skewed (by a different amount for each of the clock islands) to reduce current spikes and includes delay elements that are employed to facilitate properly timed information transfer between the clock islands, according to another embodiment of the present disclosure.

With reference to FIG. 6, a chip 600 includes four clock islands 602, 604, 606, and 608 that each receive respective clock signals from a single clock generator 610. As is illustrated: the island 602 receives a first clock signal that is not skewed; the island 604 receives a second clock signal that is skewed by one-quarter of a clock cycle; the island 606 receives a third clock signal that is skewed by one-half of the clock cycle; and the island 608 receives a fourth clock signal that is skewed by three-quarters of a clock cycle. The clock skew for the islands 604, 606, and 608 are provided by delay elements 612, 614, and 616, respectively. As is also illustrated, delay elements 620, 622, 624, 626, 628 and 630, are provided for transferring data between the islands 602 and 604, the islands 604 and 606, the islands 606 and 608, the islands 602 and 606, the islands 602 and 608, and the islands 608 and 602, respectively. The delay elements 612-630 may be programmable or fixed delay elements. It should be appreciated that cycle stealing may be employed to transfer information between clock islands to ease timing requirements. For example, the delay element 630 may be implemented to introduce a delay of one-quarter clock cycle to a signal that is launched in a previous clock cycle to effect data transfer between the islands 608 and 602. Engineering the generation of a given signal to appear one cycle early (generally described as cycle stealing) is useful in timing situations where transmitting a signal from islands 608 to 602 in one-quarter cycle, for example, may not be practical or convenient.

As should be obvious to one skilled in the art upon reading this disclosure, the actual amount of skew implemented between each of the islands may not be exactly one quarter of a clock cycle, or the sum of skews may not necessarily add up to nearly an entire clock cycle. In general, selected clock skews are an engineered trade-off between power supply spike reduction and practical timing closure (especially with respect to timing between the island 608 and the island 602).

Figure 7:
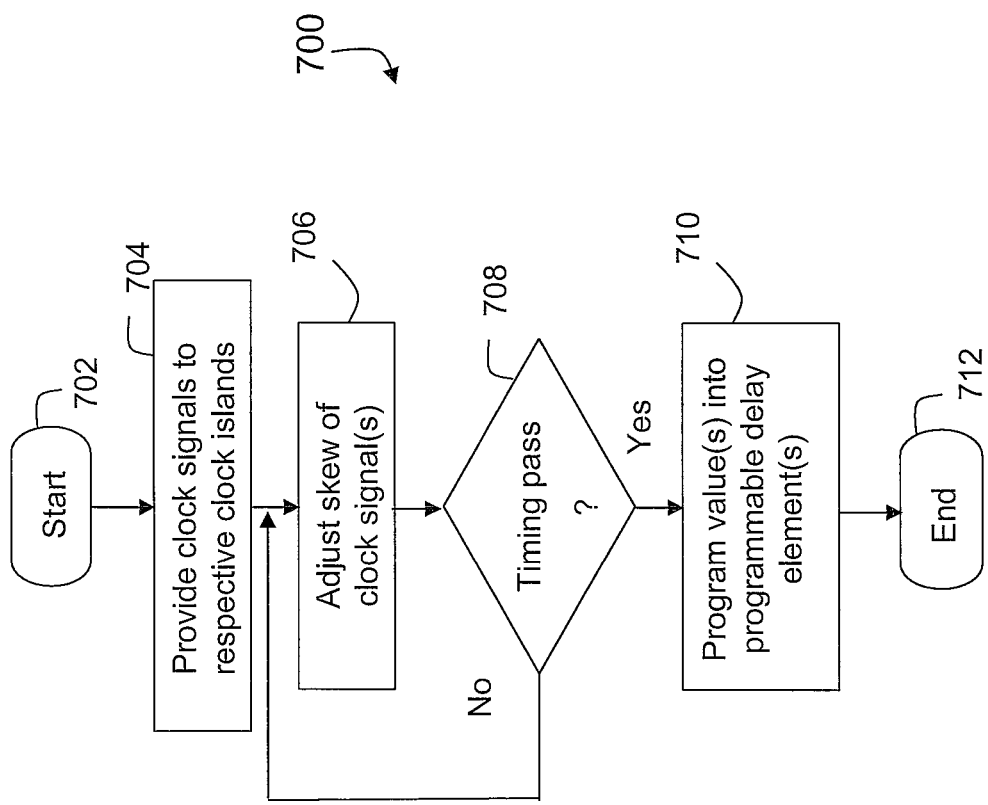
FIG. 7 is a flowchart of an example process for increasing integrated circuit yield according to one embodiment of the present disclosure.

With reference to FIG. 7, an example process 700 for increasing yield of an integrated circuit (chip) is illustrated. The process 700 attempts to determine a clock skew or clock skews that allow the chip to pass timing requirements for signal passing between the various clock island implemented within a chip. In block 702, the process 700 is initiated at which point control transfers to block 704. In block 704, clock signals are provided to each of the clock islands according to an initial clock skew arrangement. Next, in block 706, one or more of the clock skews (according to an implemented technique) is adjusted. Then, in block 708, it is determined whether the chip passes timing requirements. Next, in block 710, one or more values are programmed into one or more registers of one or more programmable delay elements (that provide the clock skew(s)). Following block 710, control transfers to block 712, where the process 700 terminates and returns to a calling routine.

Figure 8:
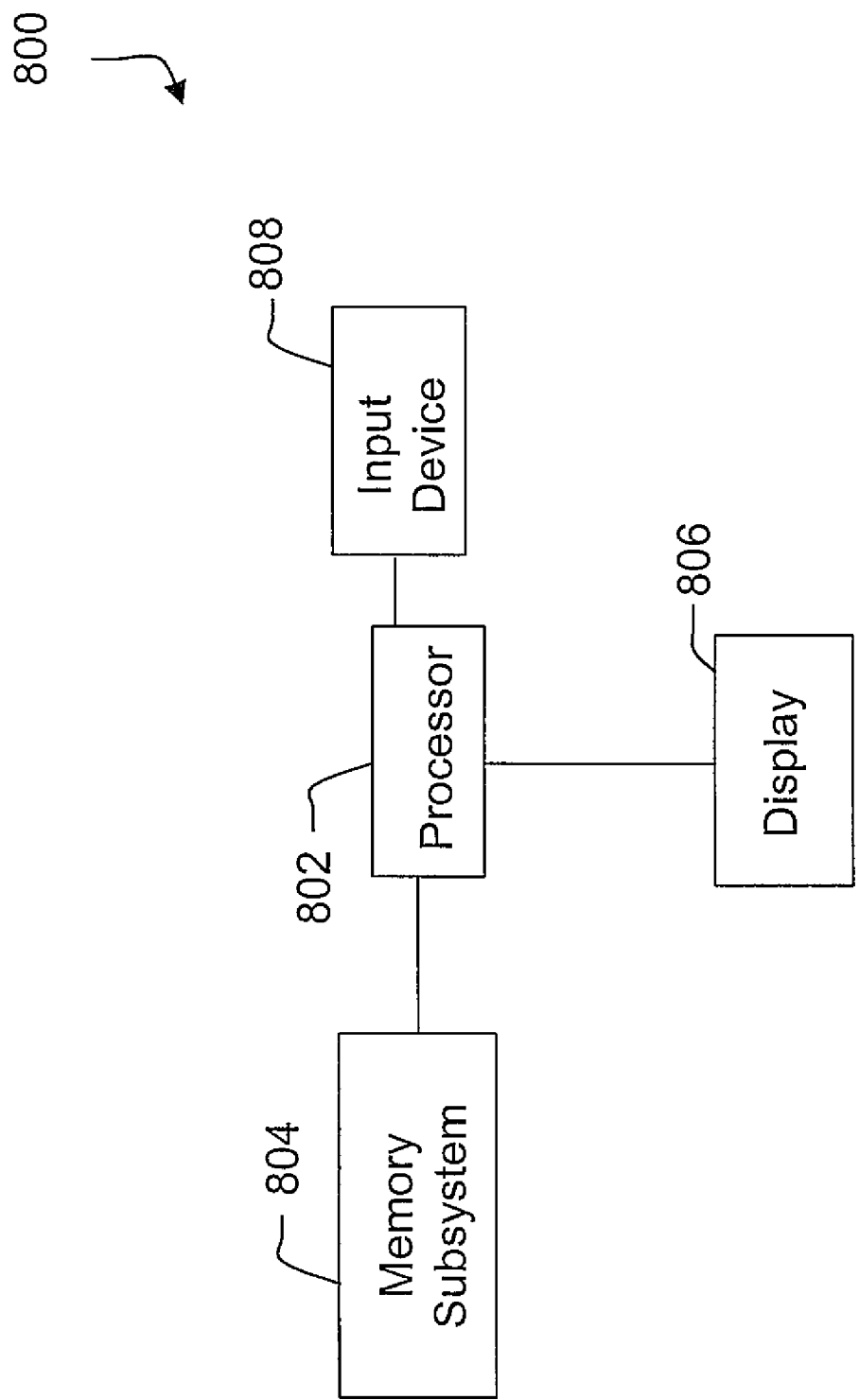
FIG. 8 is a block diagram of an example computer system that may employ one or more chips that implement clock skewing to reduce current spikes according to the present disclosure.

With reference to FIG. 8, an example computer system 800 is illustrated that may include one or more circuits that employ chips configured according to various embodiments of the present disclosure. The computer system 800 includes a processor 802 that is coupled to a memory subsystem 804, a display 806, and an input device 808. The processor 802 (or other chips) may include one or more clock islands whose clock skews are configured according to the present disclosure. The memory subsystem 804 includes an application appropriate amount of volatile memory (e.g., dynamic random access memory (DRAM)) and non-volatile memory (e.g., read-only memory (ROM)). The display 806 (which may be local or remote) may be, for example, a cathode ray tube (CRT) or a liquid crystal display (LCD). The input device 808 may include, for example, a mouse and a keyboard. The processor 802 may also be coupled to one or more mass storage devices, e.g., a compact disc read-only memory (CD-ROM) drive.

Accordingly, techniques have been disclosed herein that readily facilitate the reduction of current spikes in an integrated circuit that includes two or more clock islands whose clock signals are skewed with respect to each other.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. An integrated circuit, comprising:
   a first clock island configured to receive a first clock signal;
   a second clock island configured to receive a second clock signal;
   a clock generator configured to provide a generated clock signal, wherein the first and second clock signals are based on the generated clock signal; and
   a first programmable delay element coupled between the clock generator and the first clock island, wherein the first programmable delay element is configured to receive the generated clock signal and provide the first clock signal, and wherein the integrated circuit includes one or more additional programmable delay elements to account for a clock skew between the first and second clock signals when information is transferred between the first and second clock islands.

2. The integrated circuit of claim 1, further comprising:
   a second programmable delay element coupled between the clock generator and the second clock island, wherein the second programmable delay element is configured to receive the generated clock signal and provide the second clock signal.

3. The integrated circuit of claim 1, wherein the second clock signal corresponds to the generated clock signal.

4. The integrated circuit of claim 1, wherein the first clock island includes a first central processing unit core.

5. The integrated circuit of claim 4, where the second clock island includes a second central processing unit core.

6. The integrated circuit of claim 1, wherein a time delay provided by the first delay element is less than one cycle of the generated clock signal.

7. The integrated circuit of claim 1, wherein a predetermined amount of the clock skew is introduced between the first and second clock signals to smear out, over time, instantaneous power supply current demands of respective logic within the first and second clock islands.

8. An integrated circuit, comprising:
   a first clock island configured to receive a first clock signal, wherein the first clock island includes a first logic block;
   a second clock island configured to receive a second clock signal, wherein the second clock island includes a second logic block;
   a clock generator configured to provide a generated clock signal, wherein the first and second clock signals are based on the generated clock signal; and
   a first programmable delay element coupled between the clock generator and the first clock island, wherein the first programmable delay element is configured to receive the generated clock signal and provide the first clock signal, and wherein the integrated circuit includes one or more additional programmable delay elements to account for a clock skew between the first and second clock signals when information is transferred between the first and second clock islands.

9. The integrated circuit of claim 8, further comprising:
a second programmable delay element coupled between the clock generator and the second clock island, wherein the second programmable delay element is configured to receive the generated clock signal and provide the second clock signal.

10. The integrated circuit of claim 9, wherein the one or more additional programmable delay elements include:
a third programmable delay element coupled between the second clock island and the first clock island, wherein the third programmable delay element is configured to delay data generated by the second clock island that is transmitted to the first clock island.

11. The integrated circuit of claim 10, wherein the one or more additional programmable delay elements include:
a fourth programmable delay element coupled between the first clock island and the second clock island, wherein the fourth programmable delay element is configured to delay data generated by the first clock island that is transmitted to the second clock island.

12. The integrated circuit of claim 8, wherein the second clock signal corresponds to the generated clock signal.

13. The integrated circuit of claim 8, wherein a time delay provided by the first delay element is less than one cycle of the generated clock signal.

14. The integrated circuit of claim 8, wherein a predetermined amount of the clock skew is introduced between the first and second clock signals to smear out, over time, instantaneous power supply current demands of respective logic within the first and second clock islands, and wherein the clock skew effectively reduces power supply noise.

* * * * *